April 19, 1949.   R. H. MUNSON   2,467,944
CONTROL FOR WATER HEATERS
Filed Sept. 11, 1943   3 Sheets-Sheet 1

Inventor
Ralph H. Munson
By Robert M. Dunning
Attorney

April 19, 1949. R. H. MUNSON 2,467,944
CONTROL FOR WATER HEATERS
Filed Sept. 11, 1943 3 Sheets-Sheet 2
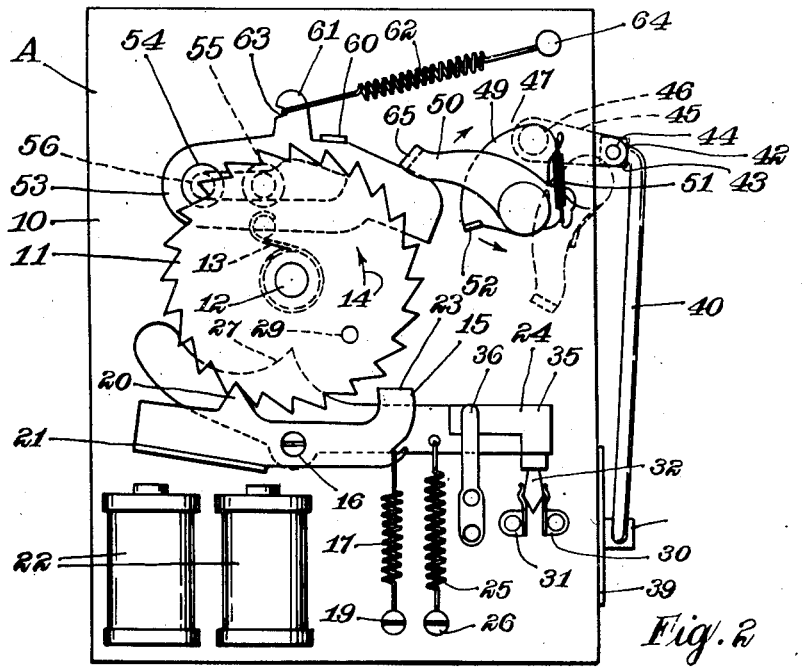
Fig. 2
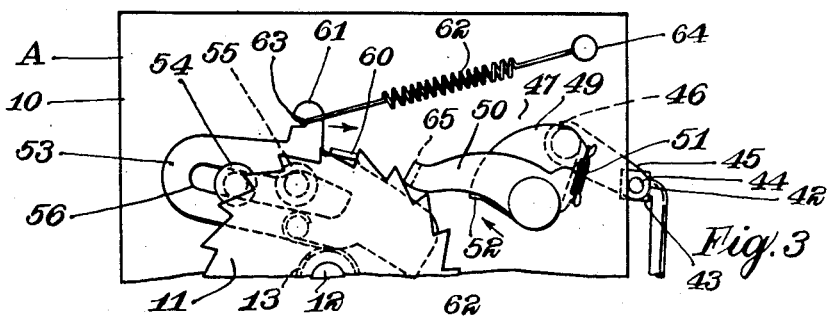
Fig. 3
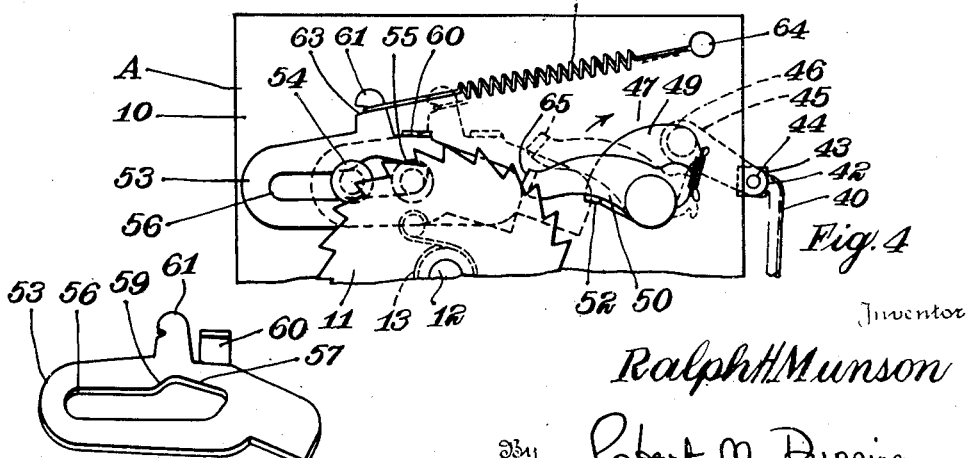
Fig. 4
Fig. 5
Inventor
Ralph H Munson
By Robert M. Dunning
Attorney Patented Apr. 19, 1949

2,467,944

UNITED STATES PATENT OFFICE 2,467,944

CONTROL FOR WATER HEATERS

Ralph H. Munson, St. Paul, Minn.

Application September 11, 1943, Serial No. 502,033

4 Claims. (Cl. 161—1)

1

My invention relates to an improvement in control for water heater or the like, wherein it is desired to provide a means capable of turning on a water heater, or similar object, for a variable interval of time.

Various timing devices have been provided for operating water heaters for a controlled period. These devices are ordinarily set for a selected period of time and a clock or measuring device maintains the heater in operation for the desired period of time. Such a mechanism is ordinarily rather costly to install and is subject to some difficulty due to the intermittent operation of the timing clock.

The present invention resides in a timing device which will operate for a predetermined minimum interval or for any multiple of this minimum interval. In other words, if the minimum interval for actuation of the heater is one minute, the heater may be actuated for any desired number of minute intervals up to predetermined maximum time.

A feature of the present invention lies in the fact that the switch mechanism controlled by the controlling device may be mounted on a pivoted lever or the like so that the closing and opening of the switch means can take place virtually instantaneously. This construction obviates the difficulty of a gradual operation of the circuit closing switch at times to injure the points of the switch by arcing as the switch contacts slowly approach one another.

A further feature of the present invention lies in the fact that the controlling device can be very simply and inexpensively installed. In order to properly install the system it is only necessary to provide one or two wires extending from the control unit to a suitable push button where the ground acts as a return wire. Such wires can be readily installed to various points of a house or apartment, thus making the installation much simpler than in constructions where manually operating chains or cables are required.

A feature of the present invention lies in the fact that the control is located near the water heater, and it is only necessary to provide a simple push button at any convenient location to actuate the control. Preferably a signal light is mounted adjacent the push button so as to indicate the operation of the heater by producing a signal when the heater is turned on.

A feature of my invention lies in the provision of a ratchet gear or the like which is used in combination with an escapement mechanism and which is normally urged in one rotatable direction. Actuation of the push button operates the escapement mechanism so as to rotate the ratchet in a direction to unwind its spring. The ratchet is returned to fully wound position by means of a movable pawl or dog mechanism which operates at spaced intervals continuously until the ratchet attains fully wound position. As a result the mechanism which accomplishes the work is all located at the control and it is only necessary to operate the easily operated escapement mechanism in order to set the control into operation.

These and other objects and novel features of my invention will be more clearly and fully set forth in the following specification and claims.

In the drawings forming a part of my specification:

Figure 2 is a view similar to Figure 1 showing the parts of the apparatus in a different relative position than was illustrated in Figure 1.

Figure 3 is a view showing the pawl mechanism for actuating the control ratchet, these parts being in a different relative position than is shown in Figures 1 and 2.

Figure 4 is a view similar to Figure 3 showing the parts of the device in still a different relative position than was shown in the previous figures.

Figure 5 is a perspective view of the pawl or dog used to return the ratchet to wound position.

Figure 1:
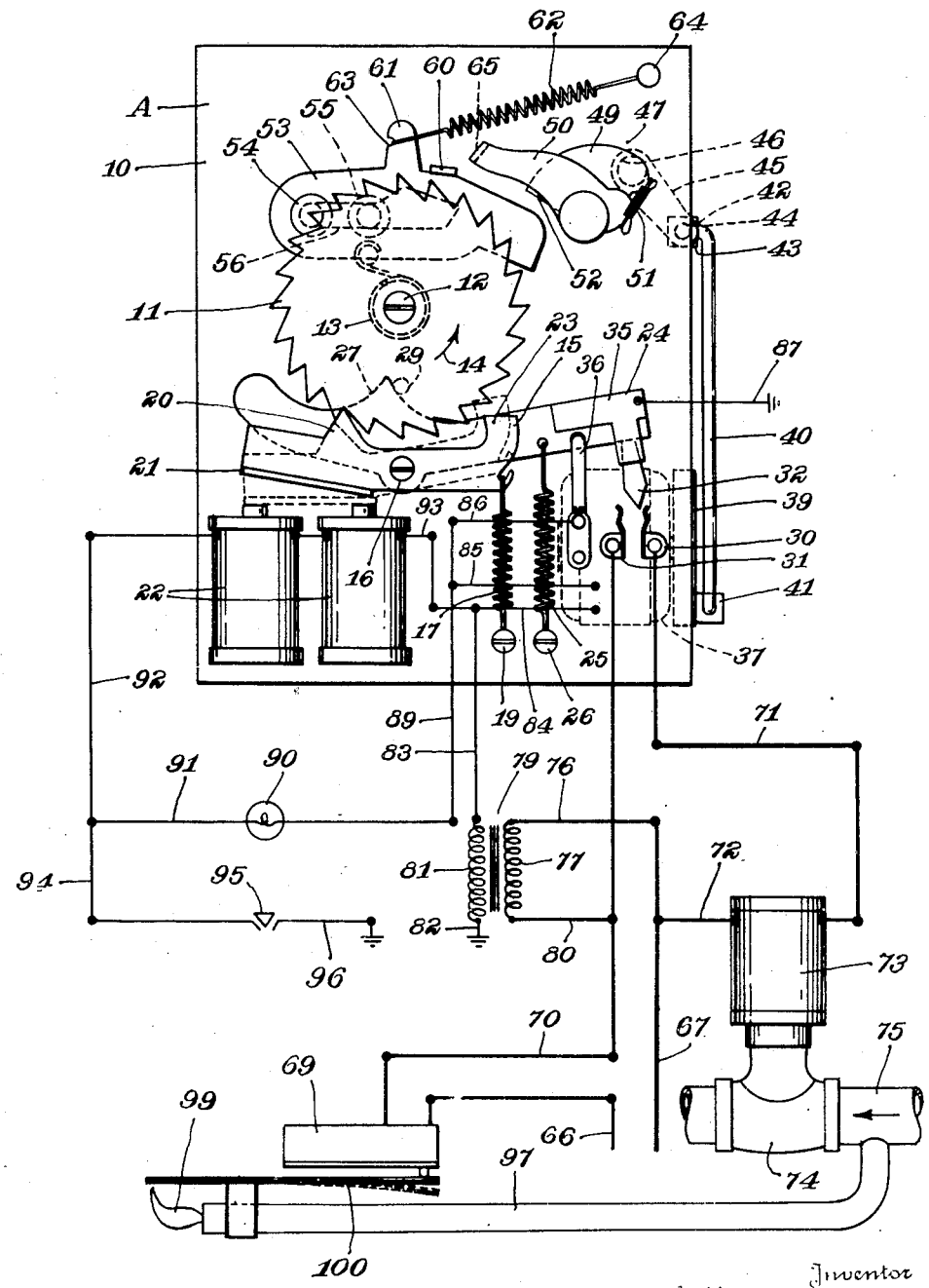
Figure 1 is a diagrammatic view of the control showing the wiring diagram in combination therewith.

The control device A includes a base plate 10 formed of insulation material, or the like, forming a support for the operating mechanism. A ratchet 11 is rotatably mounted on a shaft 12 which extends substantially normal to the surface of the base 10. A spring 13 normally urges the ratchet 11 in a counter-clockwise direction as indicated by the arrow 14 in Figures 1 and 2.

In order to hold the ratchet 11 from rotation I provide an escapement lever 15 pivotally secured at 16 to the base plate 10. The lever 15 is urged in a clockwise direction by means of a spring 17 connected to one end of the lever 15 and anchored at 19 to the base 10. A projection 20 is urged into engagement with the teeth of the ratchet 11 by means of the springs 17, this projection 20 normally preventing the rotation of the ratchet 11.

An armature plate 21 is provided on the lever

15. This armature plate 21 may be attracted by the magnet coils 22 mounted on the base plate 10 when the magnet coils are energized. Such energization of the coils 22 pivots the lever 15 to withdraw the projection 20 from engagement with a tooth of the ratchet 11.

In order to prevent free rotation of the ratchet 11 upon withdrawal of the projection 20, I provide a cooperating projection 23 on the lever 15 which engages the teeth of the ratchet 11 when the projection 20 is retracted. When the projection 20 is disengaged from any tooth of the ratchet the projection 23 is in engagement therewith so as to prevent rotation of the ratchet more than approximately one-half the circumferential distance between the ratchet teeth. When the magnets 22 are de-energized the spring 17 will return the lever 15 to its normal position indicated in full lines in Figure 1 of the drawings, whereupon the projection 20 will engage the tooth next succeeding the tooth ordinarily engaged before actuation of the magnets 11.

In other words, the lever 15 cooperates with the ratchet 11 in the manner usual to an escapement mechanism to permit advance of the ratchet 11 a radial direction of one tooth for each actuation of the magnets 22.

A switch lever 24 is pivoted at 16 coaxial with the lever 15. The lever 24 is normally urged in a clockwise direction by a spring 25 which is anchored to the base plate 10 at 26. The lever 24, however, is provided with a projection 27 thereupon which is engageable with a pin 29 mounted upon the ratchet 11. When the pin 29 is in engagement with the projection 27 the lever 24 is pivoted in a counter-clockwise direction into the position illustrated in full lines in Figure 1 of the drawings. However, when the escapement mechanism is actuated to permit the ratchet 11 to pivot through the angular distance of one tooth of the ratchet the pin 29 is moved out of engagement with the projection 27 and the lever 24 pivots into the position illustrated in dotted outline in Figure 1 of the drawings and illustrated in full lines in Figure 2 of the drawings.

A pair of cooperable contacts 30 and 31 may be closed by a wedge-shaped circuit closing contact 32 mounted near one end of the lever 24. A contact plate 35 is also provided on the lever 24 which is engageable with a fixed contact 36 when the lever 24 is in the full line position shown in Figure 2 of the drawings. The contact 36 is spaced from the contact plate 35 when the lever 24 is in the inoperable position shown in Figure 1 of the drawings.

Explanation has been made of the manner in which the ratchet 11 may be unwound by the escapement lever 15. The manner in which the ratchet 11 is reset into wound position will now be described.

A motor 37 is secured to the undersurface of the base plate 10. A cam wheel or crank arm 39 is rotatably supported by the motor 37. The motor 37 is equipped with a gear reduction so that the cam 39 will rotate at an extremely slow rate of speed. For example one rotation of the cam 39 may be made every two minutes.

A link 40 is pivotally connected to the cam wheel or crank arm 39 at the point 41. This link is pivotally connected at 42 to a block 43 which is swivelly connected at 44 to an arm 45. The arm 45 oscillates a shaft 46 which projects through the base plate 10.

Upon the shaft 46 is secured the resetting assembly indicated in general by the numeral 47. This assembly 47 includes a flat plate 49, to the surface of which is pivoted an arm 50. A spring 51 between the arm 50 and the plate 49 urges the arm 50 in a counter-clockwise direction. A stop shoulder 52 on the plate 49 limits rotatable movement in a counter-clockwise direction. However, the arm 50 may pivot in a clockwise direction by stretching the spring 51.

A pawl or dog 53 is slidably supported upon the plate 10 by means of pins 54 and 55 which extend through a slot 56 in the pawl or dog. The slot 56 is shaped in the manner best illustrated in Figure 5 of the drawings, this slot having a wedge-shaped enlargement 57 at one end thereof which terminates in a cam shoulder 59. A ratchet engaging finger 60 extends at right angles to the plane of the flat dog 53 and a projecting ear 61 provides an anchoring point for one end of a spring 62. The spring 62 is anchored in a notch 63 in the ear 61 and connects this ear with a fixed anchoring point 64 on the base plate 10. Due to the fact that the spring is attached to the ear 61 at a point substantially spaced from the center line of the dog or pawl 53, the spring 62 tends to rotate the pawl or dog in a clockwise direction. The dog or pawl 53 is prevented from such rotation, however, by the two pins 54 and 55 engaged in the slot 56.

The pawl or dog 53 is supported below the surface of the ratchet 11 so that it may slide freely without interference with the ratchet in one direction. However, the upstanding finger 60 projects up from the pawl to the level of the ratchet and this finger may engage any of the various ratchet teeth. The spring 62 is substantially stronger than the spring 13 so that when the finger 60 engages one of the teeth of the ratchet 11 the ratchet will be rotated in a clockwise direction, contrary to the arrow 14, by the spring 62.

In order that the operation of the present device may be understood, various positions of the resetting assembly have been illustrated in the various figures of the drawings. When the control is not in operation the arm 50 and the resetting assembly 47 are in substantially the position illustrated in Figure 1 of the drawings. When the magnets 22 are energized the escapement lever 15 is pivoted in a counter-clockwise dirction allowing the ratchet 11 to rotate in a counter-clockwise direction through a fraction of the length of one of the teeth of the ratchet. When the magnets 22 are de-energized the spring 17 returns the escapement arm or lever 15 to the position illustrated in full lines in Fig. 1 of the drawings, with the projection 20, however, engaging the next adjacent ratchet tooth. The movement of the ratchet 11 in a counter-clockwise direction acts to disengage the pin 29 from the projection 27 on the lever 24, thus permitting the lever 24 to pivot in a clockwise direction. This action causes the wedge-shaped contact 32 to electrically connect the contacts 30 and 31 and causes a circuit to be completed between the contact 36 and the plate 35.

By means of a circuit which will be later described in detail, the motor 37 is set into operation rotating the cam or crank arm 39. This action causes rotation of the cam or crank arm very slowly swinging the arm 45 in a counter-clockwise direction and similarly rotating the plate 49 and the arm 50 forming a part of the resetting assembly.

As the resetting assembly 47 pivots in a counter-clockwise direction the arm 50 moves into engagement with the dog or pawl 53. The arm 50 is provided with a downwardly projecting flange 65 which engages the edge of the dog or pawl 53. The arm 50 is positioned above the level of the pawl 53, but below the level of the ratchet 11.

The flange 65 is drawn along the upper edge of the pawl 53 as the resetting assembly oscillates in a counter-clockwise direction. Figure 2 illustrates the manner in which the arm 50 pivots relative to the plate 49 to permit continued pivotal movement of the resetting assembly 49 on its shaft 46. Eventually the flange 65 on the arm 50 passes the end of the pawl or dog 53, whereupon the spring 51 pivots the arm 50 back against its stop shoulder 52. The position of the arm 50 and the resetting assembly 47, upon reaching the extremity of its counter-clockwise oscillation, is shown in dotted outline in Figure 2 of the drawings.

When the resetting assembly 47 reaches the extremity of its movement in a counter-clockwise direction the cam or crank arm 39 has rotated through substantially one hundred eighty degrees. Further rotation of the motor 37 starts the resetting assembly into rotation in a clockwise direction.

As the resetting assembly 47 pivots in a clockwise direction the flange 65 on the arm 50 engages the end of the dog or pawl 53, as illustrated in full lines in Figure 4 of the drawings. As the arm 50 is held from rotation by the stop shoulder 52, the dog or pawl slide to the left as viewed in Figure 4 of the drawings, to its extreme position which is closely approached in Figure 4 of the drawings. As the pawl 53 moves to the left the arm 50 exerts a force upon the right hand end of the pawl which tends to rotate the pawl in a counter-clockwise direction about its supporting pins. This force by the flange 65 counteracts the force of the spring 62, tending to pull the pawl or dog 53 to the right and also to rotate this pawl in a clockwise direction. As a result the pin 55 slides along the lower straight edge of the slot 56 during movement of the pawl toward the left.

When the resetting assembly 47 swings in its clockwise direction a sufficient distance to clear the end of the pawl 53, the flange 65 on the arm 50 again rides over the edge of the right hand end of the pawl. As the flange 65 clears the end of the pawl, this pawl is pulled into its normal position by the spring 62 assuming the position indicated in dotted outline in Figure 4 of the drawings.

During the movement of the pawl 53 from the full line position shown in Figure 4 to the dotted outline position shown in this same figure the ratchet 11 is moved in a clockwise direction an angular distance equalling one tooth of the ratchet. This movement of the ratchet is accomplished by engagement of the finger 60 with one of the teeth of the ratchet, during the return movement of the pawl from its left hand position to its right hand position illustrated in Figure 4. The intermediate position of the pawl 53 between the two positions shown in Figure 4 of the drawings is illustrated in full outline in Figure 3 of the drawings.

Upon release of the finger 65 from the end of the pawl, the force tending to rotate the pawl 53 in a counter-clockwise direction is released. The spring 62 thereupon pivots the pawl in a clockwise direction, the finger 60 engaging behind one of the teeth of the pawl. The spring 62 continues moving the pawl to return the same to its normal inoperative position. During a length of movement equal to the distance between two adjacent teeth of the pawl, the finger 60 engages the tooth and rotates the ratchet in a clockwise direction. When the pawl reaches the position illustrated in Figure 3 of the drawings, the ratchet has been rotated almost the required distance. At this point, however, the supporting pin 55 engages the shoulder 59 which tends to pivot the pawl 53 in a counter-clockwise direction to disengage the finger 60 from the gear tooth. By the time this disengagement takes place the ratchet 11 is rotated a distance sufficient to permit the projection 20 to engage the next adjacent tooth thereof.

The manner in which the escapement mechanism is operated is shown diagrammatically in Figure 1 of the drawings. The line wires 66 and 67 are connected to a source of current supply. The line wire 66 extends to one terminal of a micro switch 69, the other terminal of which is connected by the conductor 70 to the contact 31 on the base 10. The cooperable contact 30 is connected by a conductor 71 to a solenoid 73 of a solenoid valve 74 controlling the flow of gas or the like through the pipe 75. The other terminal of the solenoid 73 is connected by the conductor 72 to the line wire 67.

The line 67 is also connected by the conductor 76 to the primary 77 of a transformer 79, the other terminal of which is connected by the conductor 80 to the conductor 70. Thus at all times when the micro switch 69 is closed the current will be on to energize the transformer 77.

One terminal of the secondary 81 of the transformer 79 is grounded at 82. The other secondary terminal is connected by a conductor 83 and conductor 84 to one terminal of the motor 37. The other motor terminal is connected by the conductor 85 and the conductor 86 to the contact 36 which is engageable with the contact plate 35. The contact plate 35 is grounded as indicated at 87.

A conductor 89 extends from the conductors 85 and 86 to a signal light 90 which in turn is connected by conductors 91 and 92 to one terminal of the magnets 22. The magnets 22 are connected in series and the other terminal thereof is connected by conductor 93 to the conductor 83. A conductor 94 connects with the conductor 92 and extends through the push button 95 to ground at 96.

A pilot burner pipe 97 is connected to the gas supply line 75 to provide a pilot light 99 which is constantly ignited. A strip of thermostatic material 100 is controlled by the flame 99 and when the flame 99 is ignited the micro switch 69 is closed. However, should the pilot light 99 go out the micro switch 69 will open, opening the circuit to the control and therefore preventing the operation of the same.

In operation the control circuit is set into operation when the push button 95 is depressed, closing the circuit from the ground 96 through conductors 94 and 92 to the solenoids 22. The circuit is completed from the solenoids 22 through the conductors 93 and 83, and the transformer secondary 81, one terminal of which is grounded at 82. This operation energizes the solenoid and acts to pivot the switch lever 24 in the manner which has heretofore been set forth in detail. The pivoting of the switch lever 24 acts to close a circuit between the contacts 30 and 31. This action causes a circuit from the line wire 66 through the micro switch 69 and the conductor 70 through the contacts 30 and 31 and its cooperable wedge-shaped contact 32, returning through the conductor 71 to the solenoid 73. The other terminal of the solenoid 73 is connected by the conductor 72 to the other line wire 67. Accordingly upon pivotal movement of the arm 24 the solenoid 73 is energized opening the solenoid valve 74 and allowing gas to enter the burner of the heater.

The pivoting of the lever 24 also closes a circuit to the motor 37. This circuit extends from the ground 82 through the transformer secondary 81, the conductors 83 and 84 to one motor terminal. The other motor terminal is connected by conductors 85 and 86 to the contact 36 which closes a circuit through the contact plate 35 which is grounded at 87. Thus a circuit is closed to the motor 37 which continues to be closed until the switch lever 24 is pivoted into the position illustrated in full lines in Figure 1 of the drawings.

From the foregoing description it will be obvious that each time the push button 95 is depressed the ratchet 11 will be rotated in a counter-clockwise direction an angular distance of one tooth of the ratchet. This action sets the motor 37 into operation and the motor 37 acts through the resetting mechanism 47 to reset the ratchet 11 after a desired time interval, which may be for example two minutes. During this two minutes the solenoid 73 is in operation holding the gas line 75 open.

By depressing the push button 95 two successive times the ratchet 11 will be pivoted through an angular distance equal to two of the teeth of the ratchet, and four minutes will be required to return the ratchet to its initial position. Similarly if the push button 95 is depressed twenty times in succession the ratchet 11 will be rotated through an angular distance equal to that of twenty ratchet teeth and forty minutes will be required to reset the ratchet 11 into starting position and therefore to turn off the gas supply to the heater. Thus any desired length of heating interval may be provided by pressing the push button 95 the desired number of times.

During all of the time the heater is in operation the control light 90 adjacent the push button is illuminated, thus showing that the heater is on. The circuit to the light 90 extends from low voltage coil 81 through conductors 83 and 93, magnet coils 22, conductors 92 and 91, light 90, conductors 89 and 86, contacts 36 and 35 to ground 87. The other terminal of the coil 81 is grounded at 82, thus completing the circuit. The current in this circuit is insufficient to actuate armature plate 21 as the coils 22 and light 90 are in series. Actuation of the push button 95 closes a direct circuit from current source 81 to the magnet coils 22 including conductors 83, 93, coils 22, conductors 92, 94, push button 95 and conductor 96. This direct circuit actuates magnet coils 22 to attract armature plate 21.

Figure 6:
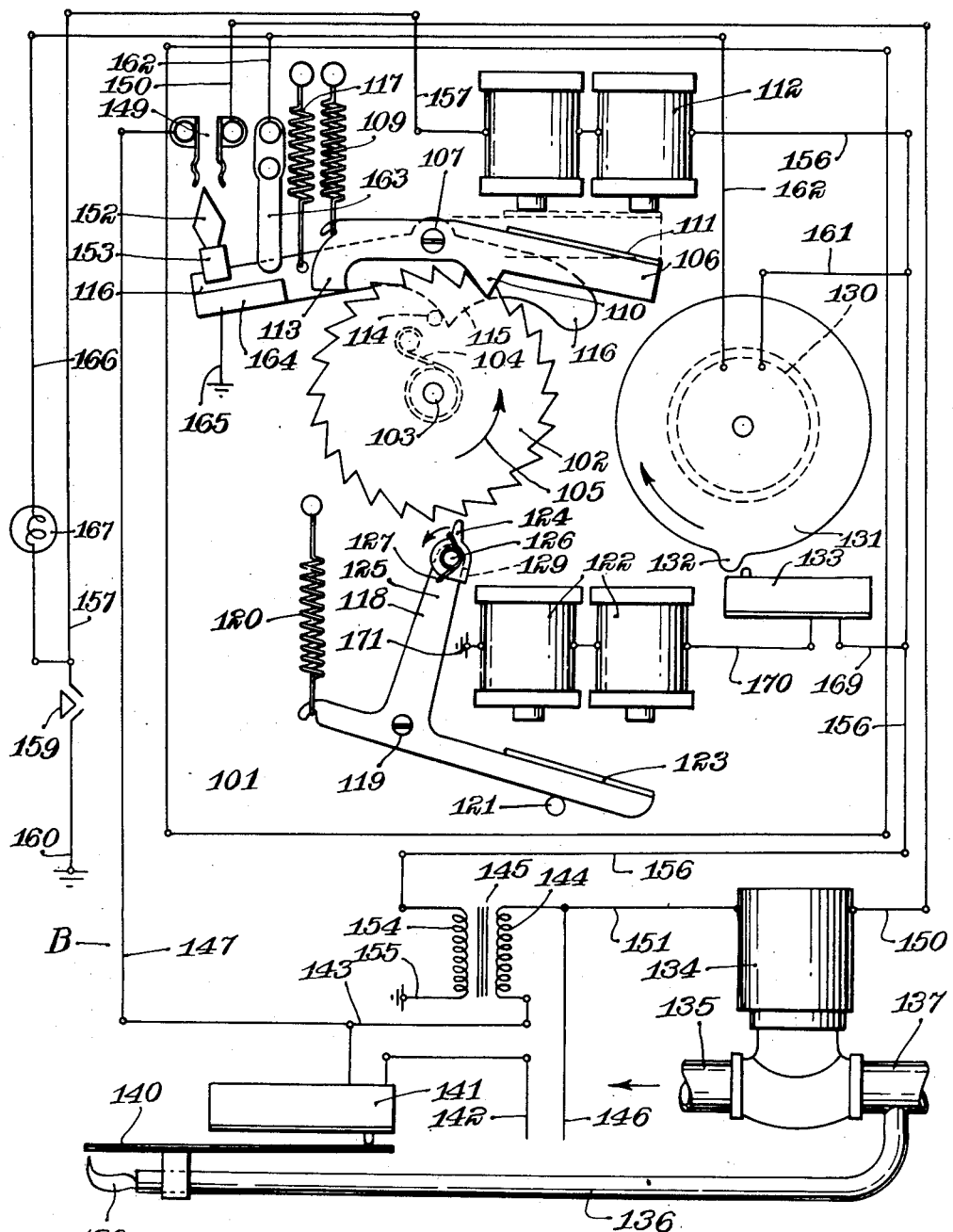
Figure 6 is a diagrammatic view showing a modified form of control and the wiring diagram used in conjunction therewith.

In Figure 6 of the drawings I disclose a modified form of control construction. It will be noted that the control A describes operation by a motor 37 which acts to actuate ratchet mechanism. I have found, however, that in some instances it is less expensive to use a simple magnetic device for resetting the ratchet. In such a case it is only necessary to provide a relatively inexpensive motor or other device which does not require the power necessary to actuate the motor 37.

The control B, illustrated in Figure 6, includes a base plate or panel 101 having a ratchet 102 pivotally mounted thereon at 103. A spring 104 normally urges the ratchet 102 in the direction of the arrow 105.

An escapement lever 106 is pivotally mounted to the base 101 at 107 and this escapement lever is normally urged in a clockwise direction by means of a spring 109 connecting one end of the arm or lever 106 with the base 101. When urged in this direction by the spring 109 the tooth 110 is in engagement with one of the teeth of the ratchet 102. The lever 106 is provided with an armature 111 formed of material which may be attracted by the magnetic device 112. Upon actuation of the magnetic device 112 the lever 106 may be pivoted in a counter-clockwise direction, disengaging the tooth 110 from the ratchet tooth it previously engaged and permitting the ratchet to pivot until a ratchet tooth engages the remaining toothed end 113 of the escapement lever 106. This action permits the ratchet 102 to unwind through a portion of the circumferential distance of one ratchet tooth. Upon opening the circuit to the magnetic device 112 the spring 109 again pivots the lever 106 in a clockwise direction, causing the tooth 110 to engage the tooth next succeeding the tooth previously engaged thereby.

The ratchet 102 is provided with a pin 114 engageable with a cam projection 115 on a switch lever 116. When the pin 114 engages the projection 115 the lever 116 is pivoted in a counter-clockwise direction, stretching the spring 117. However, when the pin 114 is pivoted out of engagement with the projection 115 the spring 117 pulls the switch arm 116 about the pivot 107, closing a pair of circuits in the manner which will be later described.

In order to reset the ratchet 102 by rotating the same in a direction to increase the tension of the spring 104, I provide a bell crank lever 118 pivoted to the base at 119 and urged in a clockwise direction by means of a spring 120, terminally anchored to the base 101. A stop 121, or other suitable means, limits rotation of the lever 118. However, when the magnetic devices 122 are energized the armature 123 on the lever 118 is attracted thereby swinging the lever 118 in a counter-clockwise direction. The pivoted 124 on the end of the arm 125 of the lever 118 engages a tooth of the ratchet 102 and swings the ratchet in a clockwise direction. The pivoted dog 124 on the end of the arm 125 of the lever 118 engages a tooth of the ratchet 102 and swings the ratchet in a clockwise direction, acting to stretch the spring 104.

The dog 124 is pivoted to the lever 125 by means of the pivot 126 and this dog is maintained in proper relative position by means of a spring 127 which urges the dog 124 into one extreme position thereof. A finger 129 on the dog 124 engages an edge of the lever arm 125 to limit rotation of the dog 124 in one direction. Thus the dog 124 may ride over the surface of the next adjacent ratchet tooth in returning to its normal position illustrated in Figure 6.

A light motor 130, or other suitable timing device, is provided for closing a circuit at predetermined intervals. The motor 130 is arranged to drive a disc having a projection 132 thereupon. The projection 132 is arranged to engage a switch 133 momentarily. While the switch 133 indirectly controls the circuit to the motor, the motor 130 will not stop while the switch is being actuated by the projection 132 due to inertia of the motor or other means.

The control is arranged to actuate a solenoid valve 134 which controls gas pressure through the gas line 135. A pilot burner tube 136 is connected to the gas line 137 in advance of the valve 134 and provides a constant flame 139, which tends to heat the thermostatic metal strip 140 controlling the switch 141. The switch 141 remains closed at all times, except when the pilot valve 139 is extinguished, whereupon the circuit through the valve 134 is broken and no actuation of the control may take place.

The circuit controlling the control B is somewhat similar to the circuit previously described in conjunction with the control A. A line wire 142 is connected through the switch 141 and conductor 143, which in turn is connected to the primary 144 of the transformer 145. The other terminal of the transformer primary 144 is connected to line wire 146. In this way the transformer 145 is constantly energized, as well as the pilot light flame 139.

The line wire 142 is connected through the normally closed switch 141 to conductor 147 which leads to one contact of a pair of spaced contacts 149. The other contact of this pair is connected by a line wire 150 to one terminal of the solenoid in the solenoid valve 134. The other terminal of this valve solenoid is connected by conductor 151 to the other line wire 146.

The contacts 149 may be closed by a conductor 152 mounted through an insulated support 153 upon the switch lever 116. Thus when the switch lever 116 is not in engagement with the pin 114 or the ratchet 102, the conductor 152 forms an electrical bridge between the contacts 149, completing the circuit therebetween..

The transformer 145 is provided with a secondary coil 154, one terminal of which is grounded at 155. The remaining terminal of the secondary 154 is connected by conductor 156 to the magnetic device 112. The remaining terminal of the magnetic device 112 is connected by conductor 157 to a manually operable push button 159, the other terminal of which is grounded at 160.

The conductor 156 is connected to a conductor 161 leading to one terminal of the motor 130, the other terminal of this motor 130 is connected by conductor 162 to a contact 163 which is engageable and disengageable with a contact plate 164 which is grounded at 165. The contact 164 is mounted upon the switch arm 116.

The conductor 162 is also connected by the conductor 166 to a signal light or means 167, the other terminal of which is connected to conductor 157. The light 167 provides an indication when the control is in operation and this signal light is extinguished when the circuit to the control is broken.

The conductor 156 is also connected by conductor 169 to the switch 133, the other terminal of which is connected by conductor 170 to one terminal of the magnetic device 122, the other terminal of which is grounded at 171.

In operation the control remains normally inactive in the position illustrated in the drawing. When it is desired to heat water, the push button 159 is depressed, closing a circuit from the secondary coil 154 through the conductor 156, the magnetic device 112 and conductor 157. As the remaining terminal of the push button 159 and one end of the transformer secondary 154 are grounded, the circuit is complete to actuate the magnetic device 112, swinging the escapement lever 106 upwardly against tension of the spring 109, and releasing the ratchet 102 for rotation through an angular distance of one tooth of the ratchet. When pressure on the button 159 is released the circuit to the magnetic device 112 is broken and the spring 109 swings the escapement lever 106 into its normal position shown in full lines in the drawing.

During this timing, however, the ratchet 102 has rotated in a counter-clockwise direction sufficiently to disengage the pin 114 from the cam projection 115. As a result the switch arm 116 is released and the spring 117 swings the switch arm 116 in a clockwise direction, closing the circuit between the contacts 149 and also closing the circuit through the contact arm 163.

As a result of the closure of these contacts a circuit is closed from line wire 142 through the closed switch 141, conductor 147, contacts 149, conductor 150, and solenoid coil valve 134, the other terminal of which is connected to the remaining line wire 146 by the conductor 151. The solenoid valve 134 is accordingly actuated, opening the valve and permitting gas or other fluid supply to pass to the burner of the heater. This gas is ignited by the pilot light flame 139. The heating of the water therefore begins virtually instantaneously upon actuation of the button 159.

When the switch arm 116 is pivoted as described, a circuit is also completed from ground 155 through transformer secondary 154, conductor 156, coils 112 of the magnetic device, conductor 157, to one terminal of the signal device 167. The other terminal of this signal device is connected by conductors 166 and 162 to the closed contacts 163 and 164, the latter of which is grounded at 165 to complete the circuit.

Rotation of the motor 130 continues until the projection 132 momentarily closes the circuit to the magnetic device 122. This circuit extends from ground 155 through transformer secondary 154, conductors 156 and 169, switch 133, conductor 170, magnetic device 122, and ground 171. The energization of the magnetic device 122 pivots the bell crank lever 117 in a counterclockwise direction, pivoting the ratchet 102 in a clockwise direction through an angular distance equal to one tooth of the ratchet. The escapement lever 106 is automatically actuated by this reverse rotation of the ratchet 102 and acts to hold the ratchet 102 in the position to which it has been advanced.

During this return rotation of the ratchet 102, the pin 114 thereon strikes the projection 115, pivoting the switch lever 116 in a counter-clockwise direction and breaking the circuits both to the solenoid valve 134, the motor 130 and the signal light 167. The gas passing through the solenoid valve 134 will then be again cut off, terminating the heating period.

Each time the push button 159 is depressed the escapement lever 106 will be actuated to permit rotation of the ratchet 102 a distance of one tooth. Therefore a single actuation of the push button 159 is arranged to provide a minimum heating period. Any desired multiple of this minimum heating period up to the number of teeth on the ratchet may be provided. Therefore, if it is learned from experience that a certain length of time is required to heat sufficient water to fill a predetermined need, this time may be obtained by actuating the push button 159 the necessary number of consecutive times.

The circuit to light 167 extends through the magnet coils 112. When the light 167 and magnets 112 are in series the light will be illuminated, but the current will be insufficient through magnets 112 to attract armature plate 111. When the push button 159 is actuated, a direct circuit to the magnets 112 eliminating the light 167 is closed. An increased current then flows through the magnets 112, attracting the armature plate 111.

In accordance with the patent statutes, I have described the principles of construction and operation of my control for water heater, and while I have endeavored to set forth the best embodiments thereof, I desire to have it understood that obvious changes may be made within the scope of the following claims without departing from the spirit of my invention.

I claim:

1. A control for an electric circuit comprising a movably mounted switch actuating member operable in two directions, an impulse operated means controlling the distance of movement in one direction, a push button electrically connected to said impulse operating means to actuate the same, means for moving said switch actuating member in the opposite direction, signal light means adjacent said push button means, and a circuit to said impulse operating means connecting said signal light in series with said impulse operated means.

2. A control for an electric circuit comprising a rotatably mounted ratchet, impulse operated means controlling rotation of said ratchet an angular distance of one ratchet tooth for each impulse, a push button electrically connected to said impulse operated means to provide impulses to actuate the same, circuit controlling means operable by said ratchet upon movement thereof into or out of a starting position, means operable to rotate said ratchet in the opposite direction, said means comprising a pawl engageable with said ratchet, a spring normally urging said pawl in one direction, and an oscillating pawl releasably engageable with said first named pawl to urge the same in one direction against the tension of said spring, means constantly oscillating said oscillating pawl, said first named pawl returning said ratchet an angular distance of one ratchet tooth during each operation thereof, said ratchet controlling operation of said means for continuously moving said oscillating pawl.

3. A control for an electric circuit comprising a rotatably mounted ratchet, impulse operated means controlling rotation of said ratchet an angular distance of one ratchet tooth for each impulse, a push button electrically connected to said impulse operated means to provide impulses to actuate the same, circuit controlling means operable by said ratchet upon movement thereof into or out of a starting position, and means for operating said ratchet in the opposite direction, said means comprising a reciprocable pawl, spring means urging said pawl in one extreme position, a reciprocable arm, a pivotal pawl pivotally supported by said arm, means for continuously oscillating said arm, said pivotal pawl being engageable with said reciprocable pawl to urge said reciprocable pawl into its other extreme position, and upon further oscillation of said oscillating arm to release said reciprocable pawl, said reciprocable pawl acting to return said ratchet a distance of one tooth, a circuit to said means for continuously operating said reciprocating arm, and means controlled by said ratchet for controlling the circuit to said continuously operating means.

4. A heater control for use with an electric circuit, including a pair of switches, means movable in two directions between two extreme positions and operable in one extreme position to open said switches, impulse operated means controlling the movement of said movable means in one direction away from said one extreme position, a push button, a push button circuit including a first conductor from one terminal of said push button to one terminal of said impulse operated means, a current supply source, a second conductor between the other terminal of said impulse operated means and one terminal of said current supply source, the other terminals of said push button and said current supply source being grounded, an indicating light, and a light circuit to said light, said light circuit including portions of said first named circuit comprising said current supply source, said second conductor, said impulse actuated means, and said first conductor, said light circuit also including said light, one terminal of said light being connected to said one conductor and a conductor connecting the other terminal of said light to one terminal of one of said switches, the other terminal of said one switch being grounded to complete the circuit.

RALPH H. MUNSON.

REFERENCES CITED

The following references are of record in the file of this patent:

UNITED STATES PATENTS

| Number | Name | Date |
| --- | --- | --- |
| 1,816,526 | Hall | July 28, 1931 |
| 1,855,741 | Ganger | Apr. 26, 1932 |
| 2,189,540 | Boerger | Feb. 6, 1940 |